US012657416B2

(12) United States Patent
Schüler et al.

(10) Patent No.: US 12,657,416 B2
(45) Date of Patent: Jun. 16, 2026

(54) READING OPTICAL CODES

(71) Applicant: SICK AG, Waldkirch (DE)

(72) Inventors: Pascal Schüler, Waldkirch (DE);
Steffen Zopf, Waldkirch (DE)

(73) Assignee: SICK AG, Waldkirch (DE)

( * ) Notice: Subject to any disclaimer, the term of this
patent is extended or adjusted under 35
U.S.C. 154(b) by 0 days.

(21) Appl. No.: 18/906,890

(22) Filed: Oct. 4, 2024

(65) Prior Publication Data

US 2025/0156662 A1     May 15, 2025

(30) Foreign Application Priority Data

Nov. 15, 2023     (EP) ..................................... 23209972

(51) Int. Cl.
*G06K 7/14*          (2006.01)
*G06V 30/424*      (2022.01)

(52) U.S. Cl.
CPC ......... *G06K 7/1443* (2013.01); *G06V 30/424*
(2022.01); *G06K 7/1413* (2013.01)

(58) Field of Classification Search
CPC .......... G06K 7/1443; G06K 7/00; G06K 7/14;
G06K 7/1404; G06V 30/424
USPC ................................. 235/454, 439, 435, 375
See application file for complete search history.

(56) References Cited

U.S. PATENT DOCUMENTS 8,740,081 B2      6/2014   Negro et al.
11,188,727 B1 *  11/2021  Lloyd .................... G06K 7/015

2008/0121688 A1    5/2008   Harrop
2010/0044439 A1    2/2010   Lee et al.
2019/0026587 A1 *  1/2019   Simpson ............ H04N 1/00331
2019/0066332 A1 *  2/2019   Vorabbi ............... G06K 7/1404
2020/0019743 A1    1/2020   Lei
2022/0343478 A1 * 10/2022   Müller ................... H04N 1/401

FOREIGN PATENT DOCUMENTS

EP          2003599 A1      12/2008
EP          3428835 A1       1/2019
EP          3534291 A1       9/2019
EP          4231195 A1       8/2023
EP          4258160 A1      10/2023

OTHER PUBLICATIONS

European Search Report dated Apr. 15, 2024 corresponding to
application No. 23209972.1.

* cited by examiner

*Primary Examiner* — Edwyn Labaze
(74) *Attorney, Agent, or Firm* — Nath, Goldberg &
Meyer; Jerald L. Meyer

(57)          ABSTRACT

An optoelectronic code reader for reading optical codes has
at least one light reception element for generating image
data from received light and a control and evaluation unit
that is configured to segment the image data to locate regions
of interest having assumed optical codes, and to further
process the regions of interest by a decoding process to read
the code content of an optical code in the region of interest.
The control and evaluation unit is further configured to
recognize a label in the image data and to process a region
of interest differently by the decoding process when the
region of interest is part of a label than when the region of
interest is not part of a label.

19 Claims, 5 Drawing Sheets

22          20b

34

38

36          30

32

READING OPTICAL CODES

Figure 1:
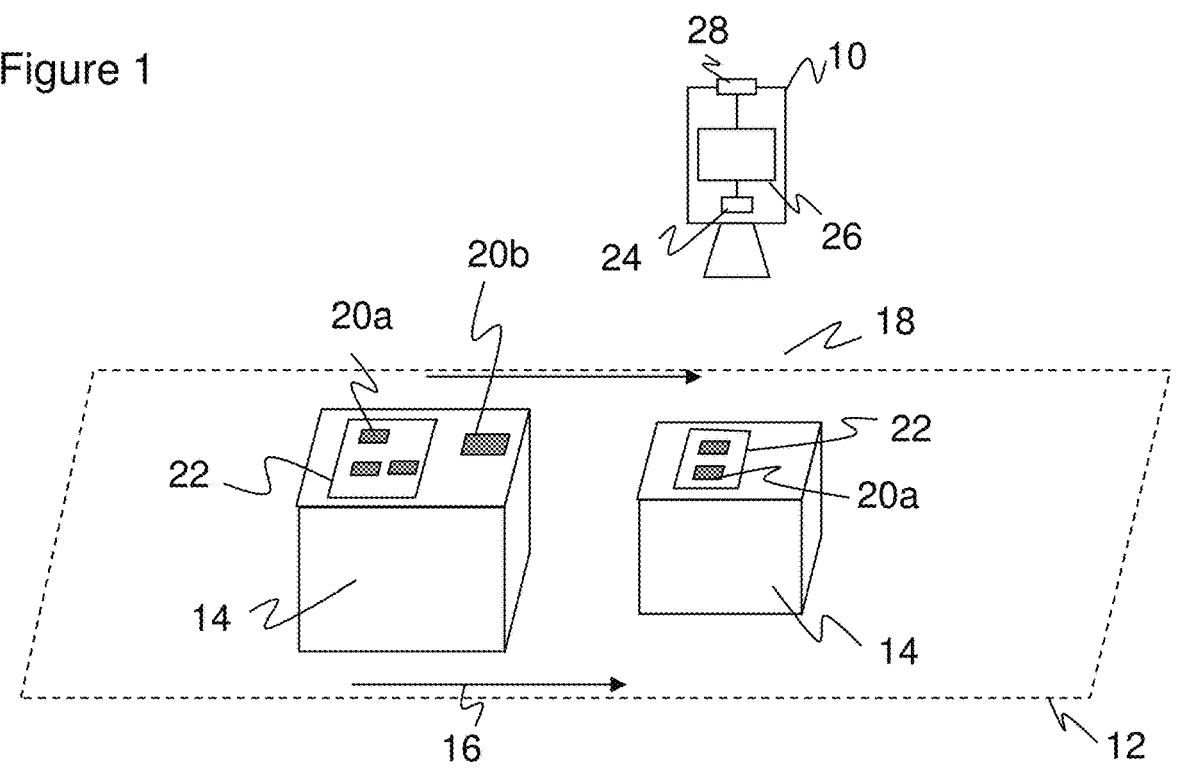

The invention relates to an optoelectronic code reader and to a method for reading optical codes respectively.

Code readers are known from supermarket checkouts, for automatic parcel identification, for sorting mail shipments, from baggage handling at airports, and from other logistics applications. In a code scanner, a reading beam is guided transversely over the code by means of a rotating mirror or by means of a polygon mirror wheel. A camera-based code reader takes images of the objects having the codes located thereon by means of an image sensor and image evaluation software extracts the code information from these images. Camera-based code readers also cope without problem with different code types than one-dimensional barcodes which also have a two-dimensional structure like a matrix code and provide more information.

In an important application type, the code bearing objects are conveyed past the code reader. A code scanner here detects the respective codes successively led into its reading zone. Alternatively, in a camera-based code reader, a line scan camera reads the object images having the code information successively and linewise with the relative movement. As a rule, image data are recorded using a two-dimensional image sensor that overlap more or less depending on the recording frequency and on the conveying speed. So that the objects can be arranged in any desired orientation on the conveyor, a plurality of code readers are often provided at a reading tunnel to record objects from a plurality of sides or from all sides.

Regions of interest or code image zones, that is those zones in the image that may potentially contain a code, are sought in a recorded output image of a code bearing object as preparation for the reading of codes. This step is called segmentation or presegmentation. The recognition of code image zones is very easy for a human observer. Viewed algorithmically, it is, however, a very demanding task. For patterns or structures in the background often have similar properties to the code image zones themselves. 2D codes having very small modules, for example, in a variety of regards have very similar properties such as text areas, logos, package ribbons, and the like.

Only a limited decoding time is typically available in a code reading application because new objects and codes are constantly detected that require a processing at least approximately in real time. A certain temporal elasticity is permissible, but the time gap may never become so large that codes are overlooked. For example, with a matrix camera, the time between two recordings of the decoding time sets an upper limit. This at least applies on average; more decoding time an exceptionally be dedicated to a recording by a processing buffer, but it is then missing in following recordings. When a line scan camera is used with successive compilations of image sections, the situation is similar. If an offset between the processed image sections and the currently recorded line becomes too large, a gap is produced at some point that can no longer be recovered under the at least approximately real time conditions.

If now the above-addressed segmentation detects false positive regions of interest in which there is actually no optical code at all, this is at the cost of the decoding time. Codes are then possibly not read because the decoder has to expend a large part of its decoding time with futile reading attempts of false positive regions of interest.

It is therefore desirable to avoid false positive regions of interest. This naturally does not mean shifting the balance toward false negative regions of interest, that is to already overlook optical codes from the start in the segmentation. A possible approach to reduce the error rate in the localizing of regions of interest overall comprises improving the segmentation. EP 4 231 195 A1, for example, uses a combination of classical image processing and a method of machine learning for this purpose.

Optical codes are usually printed on labels in the practical application. They are therefore as a rule not grouped directly on the object, but rather over the label. The labels additionally have regularities. Most shippers or logistics companies, for example, use a largely fixed layout. Information that can be derived from a label however, however, not been considered further for code reading.

EP 3 534 291 A1 deals with the reading of codes within the framework of baggage handling at airports, where a multiple reading due to so-called stub codes can occur, that is older codes that were not fully removed. In the event of a multiple reading, the geometry of the code or of a label on which the code is located is checked. They are, however, all steps downstream of the segmentation and decoding that do not contribute to a reduction of false positive regions of interest or to an improved utilization of the decoding time.

In US 2008/0121688 A1, information to be coded is distributed with an least partial overlap over two barcodes of a label. The information should thus also be detectable when one of the codes is partially covered. This does not contribute to the above-explained problems of limited decoding time and possible false positive regions of interest.

EP 3 428 835 A1 and EP 4 258 160 A1 deal with the prior knowledge of codes or code schemes with whose help codes can possibly still be read when they are damaged or when other disruptions trigger a reading error. For this purpose, a part of the code is reconstructed from the prior knowledge or from the code scheme or it is alternatively at least determined that a reading result is not correct. This all relates to the decoding itself, but not to the segmentation and does not use any information with respect to the labels.

It is therefore the object of the invention to further improve the reading of optical codes.

This object is satisfied by an optoelectronic code reader and by a method for reading optical codes in accordance with the respective independent claim. Image data of code bearing objects are recorded by a light reception element, in particular during a conveying movement of the objects. The light reception element can be an image sensor of a matrix camera or a line sensor that records successive image lines. A code scanner can also detect image data linewise. A control and evaluation unit segments the image data and thus finds regions of interest (ROIs therein having optical codes or code candidates. Where a region of interest actually contains a code is not known at this point in time; it is first only assessed using the criteria of the segmentation in which there can be false positive regions of interest. In some situations, the image data will not contain any code overall so that no regions of interest or only false positive regions of interest result from the segmentation. The regions of interest are processed by a decoder or a decoding method to read the code content of an optical code contained therein. In the event of a false positive region of interest, the decoding process will only use decoding time without coming to a reading result. A decoder preferably uses a plurality of decoding processes so that the decoding process is repeatedly addressed with an indefinite article in the following.

The invention starts from the basic idea of recognizing a label in the image data. As described in the introduction, optical codes, and frequently also other lettering are located on a common surface on a label such as a tab, sticker, or another printing surface that is attached to the object bearing the code. An attempt is made to associate the regions of interest with a label and so a distinction is made between regions of interest that are part of a label and those that are not. In this respect, in the event of a plurality of recognized labels, a distinction is preferably made as to which of the labels a region of interest belongs to. The further processing of the regions of interest by the decoding process is then made in dependence on whether the region of interest belongs to a label and optionally to which label. Differences can, for example, result with respect to the decoding process, the order of the decoding, the assigned decoding time, and the repeated reading attempts (retries) as explained below with reference to different embodiments.

The invention has the advantage that the knowledge of the belonging to a label enables an improved decoding. The available decoding time can be used better to dedicate more to real code regions instead of false positive regions of interest. The reading rate is thereby increased overall. In addition, a logical groups of regions of interest, optical codes, or their code content additionally results via the labels that can also be made available at the output side. The information can in particular be output on the label to which a reading result belongs, which label was detected, and/or whether it was fully decoded or not.

The control and evaluation unit is preferably configured to group the regions of interest by labels. A decision is thus not only made binarily whether a region of interest is located on a label or not. A grouping is rather found that associates every region of interest with a specific label. In this respect, a kind of outlier or maverick can remain, namely regions of interest that cannot be associated with any label.

The control and evaluation unit is preferably configured to determine a score (scoring) for the regions of interest on how reliable an optical code has been detected in the region of interest, and to take account of the score in the order of the processing of the regions of interest by a decoding process. The score depends on how well the segmentation criteria have been satisfied and is thus an additional result of the segmentation process. In accordance with this embodiment, the order of the decoding, unlike as in the prior art, does not depend on the score alone. A label association is rather advantageously at least also taken into account.

The control and evaluation unit is preferably configured to assign a higher score to regions of interest that are part of a label. This is a particularly simple manner of allowing the label association to enter into the order of the processing by the decoder. The score can be increased even further when a code has already been read on the same label or the label has been identified more exactly. They are namely clear indications that the respective region of interest is not a false positive result of the segmentation so that it is likely worthwhile to expend further decoding time. The assignment to the score can be inversely understood or implemented as a deduction for regions of interest outside labels. All the outliers ae thus not fully excluded from the decoding, but must already show clear signs of an optical code to have decoding time assigned.

The control and evaluation unit is preferably configured to process regions of interest of a label directly after one another by a decoding process so that regions of interest of a label are worked through as a group. Directly after one another or together means that regions of interest have not been decoded in the meantime that do not belong to the currently processed label. The order of the decoder thus differs considerably from the conventional procedure that ignores the label association. The logical association of optical codes of a common label can also be reflected in the common processing by the decoder in this embodiment. The order within the group of regions of interest of the same label can, for example, again be prioritized by scores. If a plurality of labels have been recognized simultaneously, the order of the labels can be fixed randomly or with reference to the scores of regions of interest on the label. A start is, for example, made with that label that contains the region of interest having the highest score or having the highest score on average, with the regions of most or least interest, and the like.

The control and evaluation unit is preferably configured to recognize a label using its brightness and homogeneous texture. These are two particularly characterizing features of a label. Optical codes are typically printed on paper or on a comparable white, or at least very bright, background. The search for a label in a recorded image or image region so-to-say accordingly means the search for a bright, uniform surface. The homogeneous texture naturally does not have to be demanded continually since otherwise only empty labels without codes would be found. It is rather important that a relevant proportion of, for example, 50%, 25%, or also only 10% of the label forms this homogeneous background. If the code reader can detect colors, a further differentiation is preferably made and a search is made for a white or light gray background since optical codes as a rule are not applied to a colored background, also not to a bright colored surface such as yellow or bright pink. On the other hand, the code reader may exceptionally be aware that there are labels in a specific color; this color then becomes a strong feature that indicates a label.

The control and evaluation unit is preferably configured to recognize a label with the aid of at least one of the following criteria: dark structures, shape, size, code structures contained, orientation of the code structures within the label. Dark structures correspond to the sought codes that have preferably been printed or applied in black. A label usually has a rectangular shape or at least a well-defined geometry which can also include further geometrical properties such as an aspect ratio. The size or dimensions of a label can also be subject to assumptions or can be known. Code structures contained means that signatures of optical codes are recognized, in particular typical light/dark transitions in expected patterns. Finally, code structures in a label are not randomly provided as slanted, but are applied in an ordered form, typically printed horizontally or at times also vertically into the label. Five further possible criteria for a label have thus been named; with brightness and homogeneity there are a total of seven criteria. This is not necessarily exclusive, but particularly suitable. In order not to have to work through all the criteria, advantageous sub-combinations can be formed, for example brightness, shape, and code structures contained.

The control and evaluation unit preferably has access to at least one label template that characterizes a known label type, with a label template having a plurality of optical codes present on this label type, in particular including the respective code type and/or position of the optical code within a label. Access means that the control and evaluation unit comprises a corresponding store of any desired construction or has at least indirect access to such a store. It has previously only been recognized that it is a label. Specific labels can be recognized and distinguished with the aid of label templates. Label templates can comprise different features, with the number of the optical codes accommodated thereon being particularly important, preferably together with the associated code type. Prior knowledge of the respective code can moreover be specified, for example a recurring fixed part of the code or a description of which kind of symbols are expected at at least some positions within the code. Such prior knowledge facilitates the decoding or makes it possible at all in the case of damage or disrupted image detection and reference is made to the documents EP 3 428 835 A1 and EP 4 258 160 A1 named in the introduction for further details. A position of the code on the label is preferably also indicated by the label template. This position indication is preferably relative, for example starting from a center of the label or of a code on the label selected as a reference. For this purpose, for example, beams can be indicated with angle and length starting from the reference point where a further code is correspondingly located on the label template. For reasons of implementation alone, a label template preferably contains an identification that can also be designed as speaking to enable an association with a manufacturer or with a label class recognizable for the user. A label template can optionally contain one or more of the above-named total of seven features for detecting a label, in particular which brightness of the surface is expected, which size and shape of the label, and which orientation of the codes.

The control and evaluation unit preferably has access to at least one label template that has at least one logo. A logo is accordingly provided as an alternative or supplementary feature of a label template. A logo is understood as a graphical symbol that indicates a specific label manufacturer in a recognizable manner, in particular an image/text combination. Such logos are applied to a large number of labels to indicate the manufacture of the label or the logistics company or shipper. The logo is then as a rule located in a fixed geometrical relationship with the label and the codes applied thereto. Regions of interest of a label can thereby be verified, plausibilized, or localized at all using the position of the logo on the type of a label known by the label template.

The control and evaluation unit is preferably configured for an automatic teaching in which a label template or a property of a label template is taught from detected image data. In this respect, examples of labels having codes are preferably directly shown to the code reader prior to operation. A teaching or further teaching in operation is also conceivable, for example with an initial label template that only specifies the number and kind of codes and with respect to which the positions of the codes are subsequently taught with reference to labels matching the label template. Alternatively to an automatic teaching, a parameterization by hand or an input with the aid of a graphical user interface (GUI) is conceivable. Hybrids with automatic suggestions to a user or with label templates initially prepared by hand that are then automatically refined are conceivable.

The control and evaluation unit is preferably configured to identify a label with reference to a label template, in particular with the aid of an already decoded optical code of a region of interest of the label or of a logo. The label templates make it possible to identify a label of a certain type in the image data. This can per se be output information of interest as to which labels were detected or which reading result belongs to which label. It is preferably used to assign further properties to the label with reference to the label template or to verify a decoding result. Hypotheses can be prepared or refined on the label template to which a label detected in the image data belongs using a respectively read code. The identification of a label with reference to a label template is particularly simple and robust with reference to the code content of one of the codes on the label or with reference to a logo.

The control and evaluation unit is preferably configured to process regions of interest in an at least partially identified label for so long until all the optical codes of the label have been decoded by a decoding process. At least partially means that there is at least a hypothesis as to which label template or label templates a label recognized in the image data matches. It can then be deduced from a matching label template which further codes would still have to be present, preferably even with a position indication within the label. Further retries can therefore be performed in a directed manner to ultimately fully detect and identify a label, i.e. with all its codes. In this connection, a label template gives a double condition in the sense of complete and sufficient: On the one hand, further regions of interest have to be processed by a decoding process when all the codes corresponding to the specification of the label template had not yet been able to be read. On the other hand, however, a stop can be made in processing further regions of interest of a label recognized in the image data when the read codes correspond to the label template. There can by all means be further regions of interest in the label; they are, however, now recognizably false positive regions of interest and this is recognized with the aid of the label template so that no unnecessary decoding time has to be expended for this.

The control and evaluation unit is preferably configured to transfer the code content of a region of interest having one of the plurality of optical codes of the same code content to at least one further region of interest in the case of a plurality of optical codes of the same code content being present in a label in accordance with the label template. Provision is made with some labels to apply the same code content redundantly in a plurality of codes of the label. Whether such a case is present is known from the label template. If such a label has been recognized in image data and one of the redundant codes has already been read, it is superfluous to also read the further redundant codes. Instead, in accordance with this embodiment, the reading result is transferred to all the redundant codes without any further decoding time effort.

The control and evaluation unit is preferably configured to adapt the regions of interest of a label with the aid of a label template. Thanks to a label template with positions, where the codes and thus specifically the not yet read codes have to be on the label is known for a label thereby identified. The segmentation can thus again be improved; dedicated regions of interest can be formed at exactly the right points of the label to make a successful decoding here in the next step, where possible with direct retries. This is conceivable in a plurality of respects. Regions of interest can be included that have previously been overlooked as false negative because the respective location is looked at more exactly or even weaker structures are now accepted; already segmented regions of interest can be discarded as false positive because they are located at a position at which no code at all is provided in the label or the position and size can be improved in an already segmented region of interests.

The method in accordance with the invention can be further developed in a similar manner and shows similar advantages in so doing. Such advantageous features are described in an exemplary, but not exclusive manner in the subordinate claims dependent on the independent claims.

Figure 2:
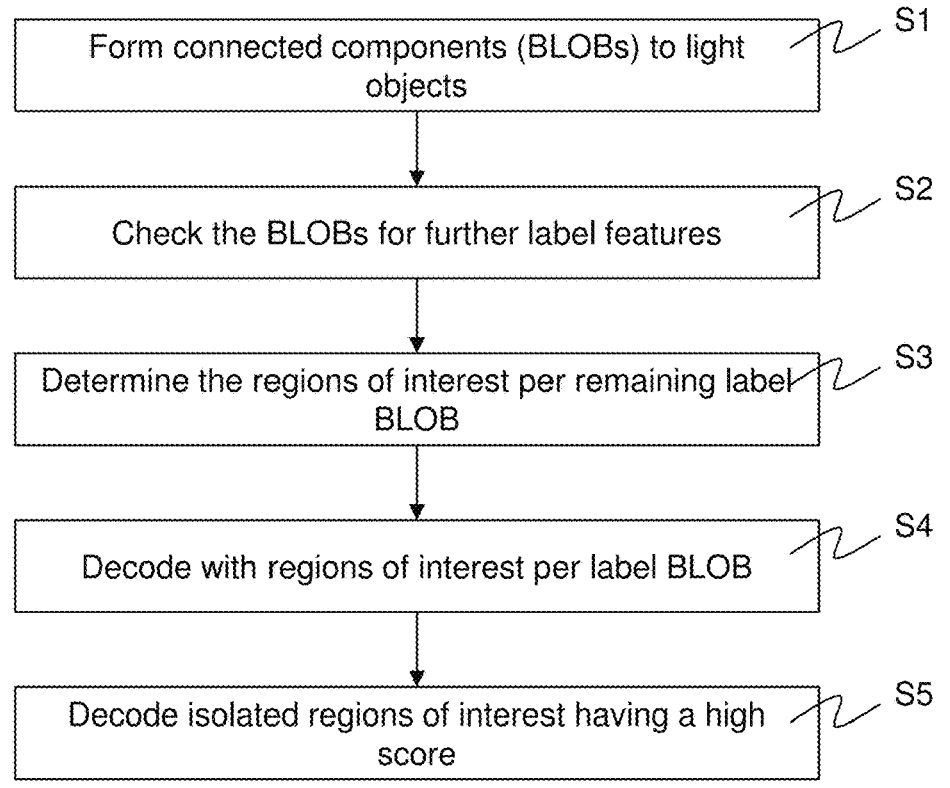
Figure 3A:
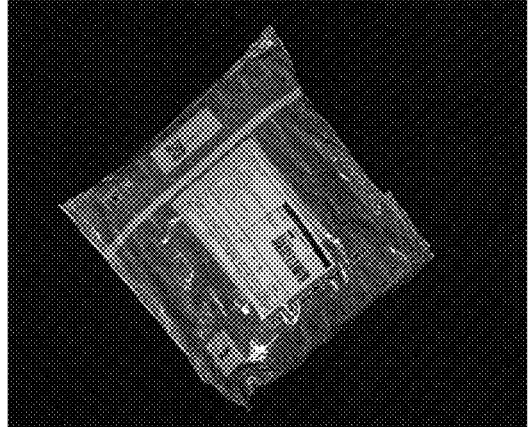
Figure 3B:
Figure 3C:
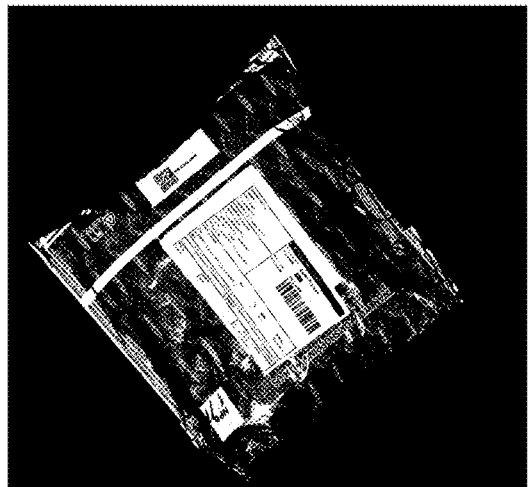
Figure 3D:
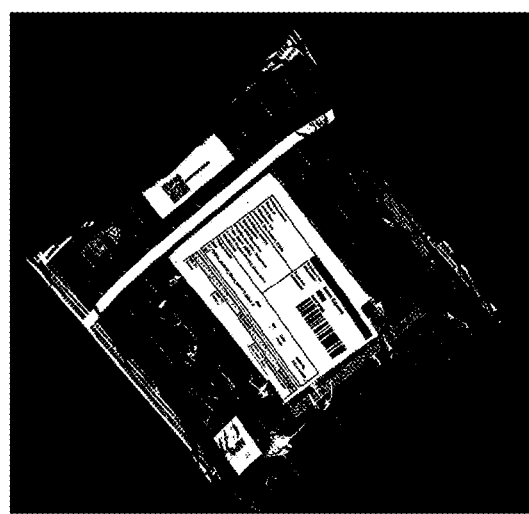
Figure 3E:
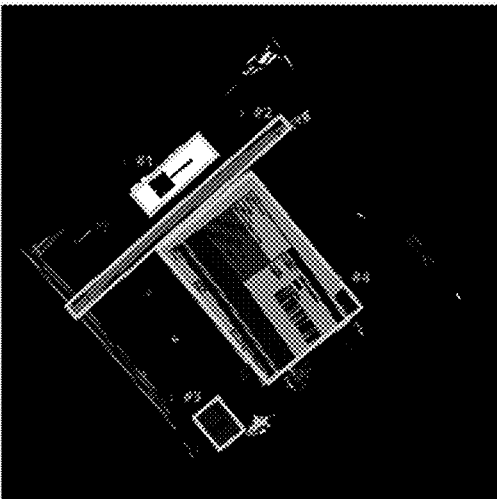
Figure 4:
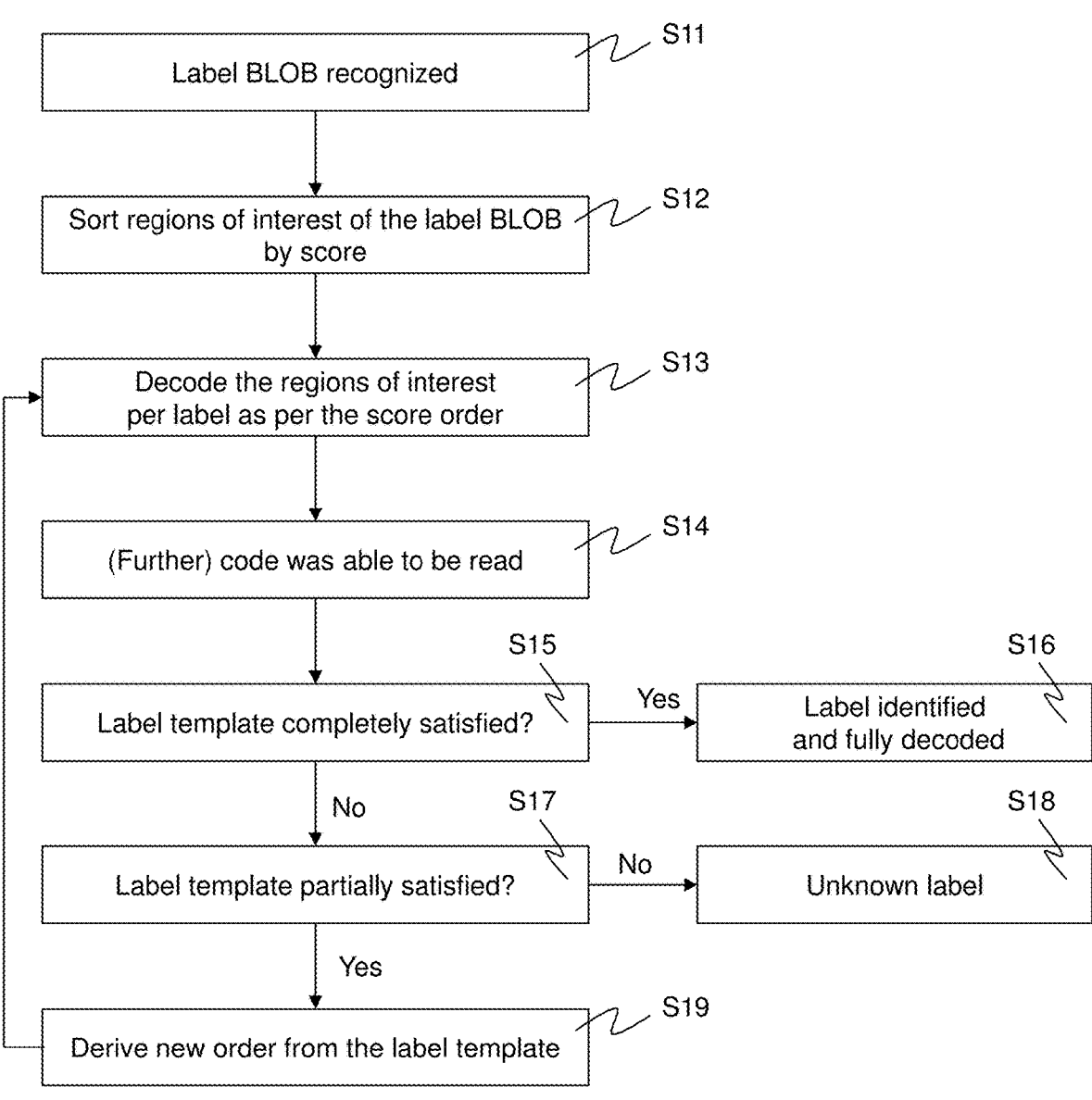
Figure 5:
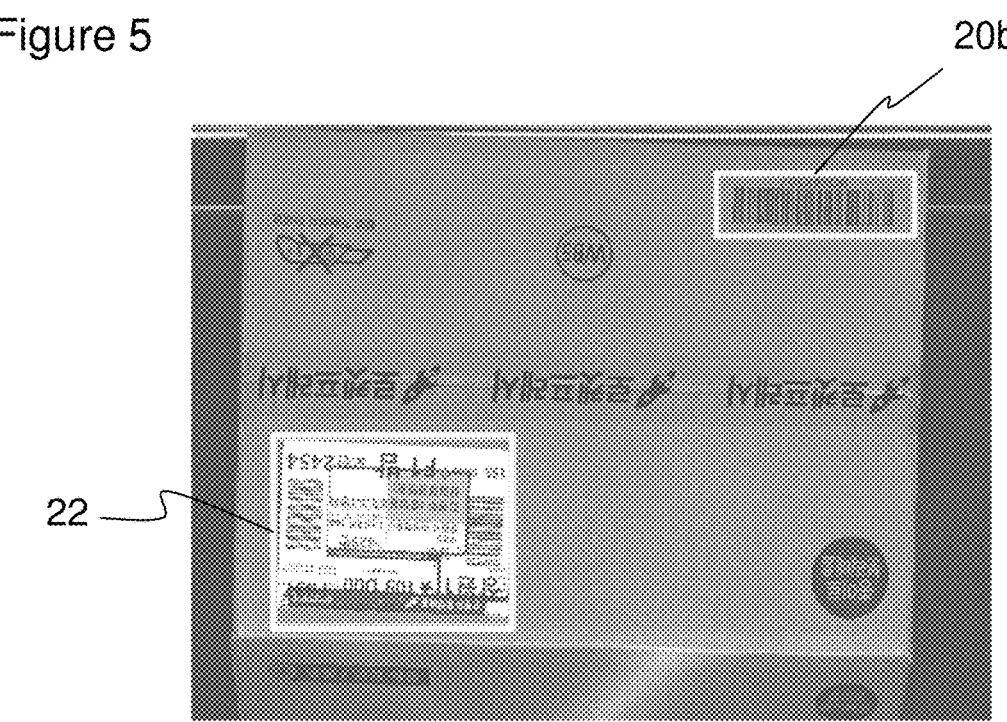
Figure 6:
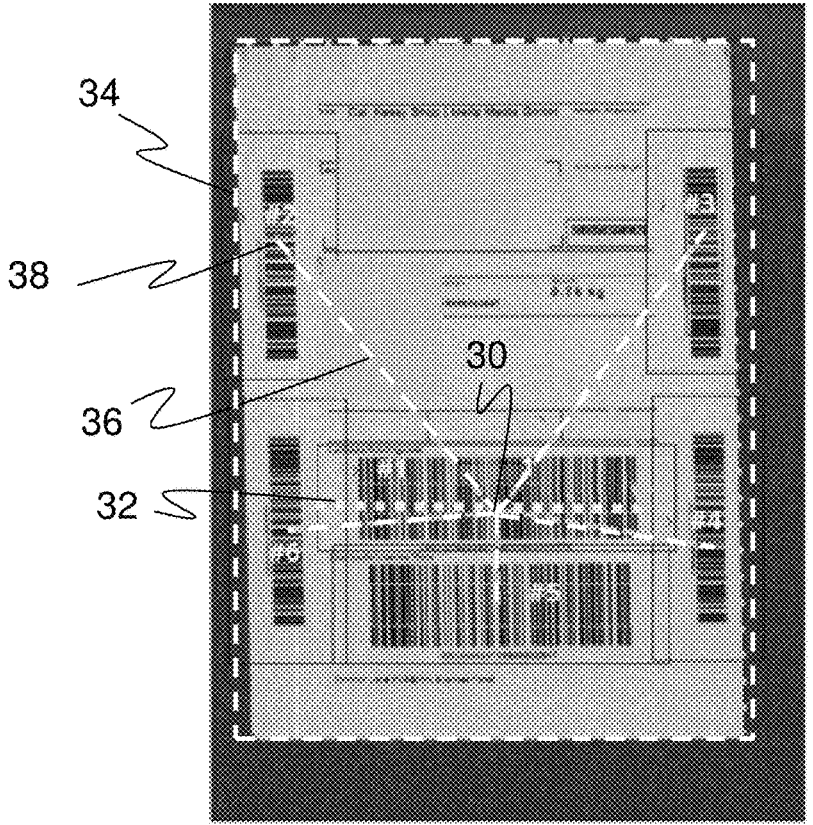
Figure 7A:
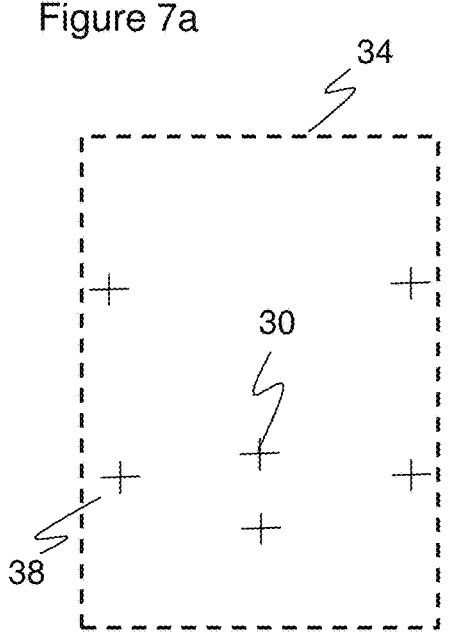
Figure 7B:
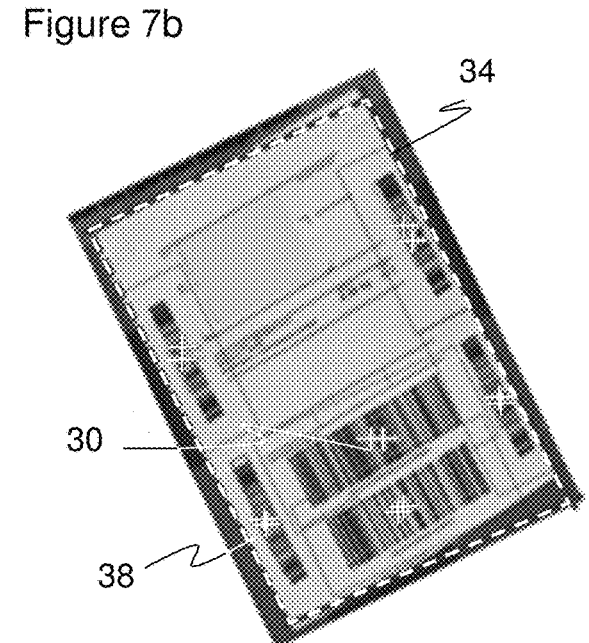
Figure 8:
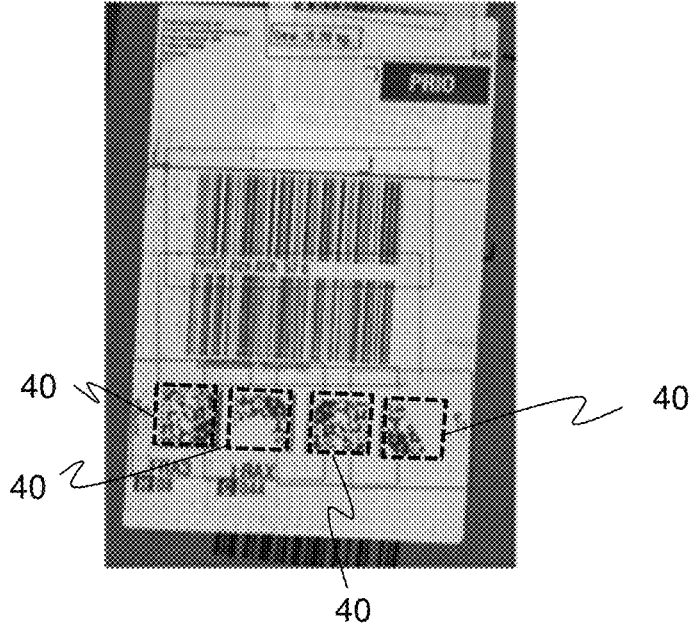

The invention will be explained in more detail in the following also with respect to further features and advantages by way of example with reference to embodiments and to the enclosed drawing. The Figures of the drawing show in:

FIG. 1 a schematic three-dimensional overview representation of the exemplary installation of a code reader above a conveyor belt on which objects having codes to be read are conveyed;

FIG. 2 an exemplary flowchart for detecting labels and for decoding with respect to labels;

FIGS. 3a-e exemplary images in different stages of the recognition of labels, namely the unprocessed starting image in FIG. 3a, a detail enlargement of disruptive structures confusable with codes in FIG. 3b, the emphasized structures brighter than a threshold in FIG. 3c, the use of an erosion filter in FIG. 3d, and a marking of the total of four possible labels remaining in this example;

FIG. 4 an exemplary flowchart for identifying a label using a label template and for the decoding with reference thereto;

FIG. 5 an exemplary image of an outlier code that is not applied to a label;

FIG. 6 an exemplary image having a plurality of codes to illustrate the indication of positions of the codes on a label with reference to beams with angle and length;

FIG. 7a an illustration of the information of a label template with respect to shape and positions;

FIG. 7b an illustration of the check whether a label template matches information on a recorded label with reference to the shape and position shown in FIG. 7a; and FIG. 8 an exemplary image of a label having redundant codes.

FIG. 1 shows an optoelectronic code reader 10 in a preferred situation of use mounted above a conveyor belt 12 that conveys objects 14, as indicated by the arrow 16, through the detection zone 18 of the code reader 10. The objects 14 bear codes 20a-b on their outer surfaces which are detected and evaluated by the code reader 10. A number of the codes 20a are located groupwise on a label 22, with these exceptionally being able to be codes 20b outside the labels 22 called outliers. The codes 20a-b and 22 can only be recognized by the code reader 10 when they are affixed to the upper side or at least in a manner visible from above. Differing from the representation in FIG. 1, a plurality of code readers 10 can be installed from different directions for the reading of a code affixed somewhat to the side or to the bottom in order to permit a so-called omnireading from all directions. The arrangement of the plurality of code readers 10 to form a reading system mostly takes place as a reading tunnel in practice. This stationary use of the code reader 10 at a conveyor belt is very common in practice. The invention, however, primarily relates to the code reader 10 itself and to the method implemented therein for the reading of codes so that this example may not be understood as restrictive.

The code reader 10 detects image data of the conveyed objects 14 with the codes 20a-b and labels 22 by an image sensor 24 and said image data are further processed by a control and evaluation unit 26 by means of image evaluation and decoding processes. It is not the specific imaging process that is important for the invention so that the code reader 10 can be set up in accordance with any principle known per se. For example, only one line is detected in each case, whether by means of a linear image sensor or a scanning process, with a simple light receiver such as a photodiode being sufficient as an image sensor 24 in the latter case. The control and evaluation unit 26 stitches the lines detected in the course of the conveyor movement together to form the image data. A larger zone can already be detected in a rerecording fusing a matrix-like image sensor, with the stitching of recordings here also being possible both in the conveying direction and transversely thereto. The plurality of recordings are recorded after one another and/or by a plurality of code readers 10 whose detection zones 18, for example, only cover the total width of the conveyor belt 12 together, with each code reader 10 only recording a part section of the total image and in particular the part sections being stitched by image processing. An only fragmentary decoding within individual part sections with a subsequent stitching of the code fragments is also conceivable.

The code reader 10 outputs information such as how read codes 20a-b, recognized labels 22 or kinds of labels, and image data or details thereof via an interface 28. It is also conceivable that the control and evaluation unit 26 is not arranged in the actual code reader 10, that is in the camera shown in FIG. 1, but is rather connected as a separate control device to one or more code readers 10. The interface 28 then also serves as a connection between an internal and external control and evaluation. The control and evaluation functionality can be distributed practically as desired over internal and external modules, with the external modules also being able to be connected via a network or cloud. No further distinction is made of this all here and the control and evaluation unit 26 is understood as part of the code reader 10 independently of the specific implementation. The control and evaluation unit 26 can comprise a plurality of modules such as an FPGA (field programmable gate array), a microprocessor (CPU), and the like. Specialized hardware modules, for instance an AI processor, an NPU (neural processing unit), a GPU (graphics processing unit), or the like can in particular be used for the segmentation still to be described using a neural network.

It is the object of the code reader 10 to read the codes 20a-b. Regions of interest in which a code 20a-b is probably located are first determined as a pre-processing step of the image data. This is also called segmentation or presegmentation and is known per se, for example as a combination process of classical image processing and a method of machine learning in accordance with EP 4 231 195 A1 named in the introduction. A score can be determined by the segmentation as to how probable it is with reference to the segmentation criteria that a code 20a-b is located in the region of interest. The regions of interest or code candidates are then processed by a decoder that uses one or more decoding processes to read the code content. There can be false positive regions of interest here in which no code is actually present at all. Some of the available decoding time is then unnecessarily expended and the decoding time is limited, as already described in the introduction, since the application constantly generates new image data and therefore requires an evaluation at least approximately in real time.

In accordance with the invention, the segmentation and decoding are supported by the recognition of labels 22 and the dedication of certain properties or processing steps in dependence on whether there is a code 20a-b on a label 22 or not and preferably even more differentiated depending on the type of label 22. This will now first be presented in the form of a brief overview and will subsequently be explained in more detail with reference to FIGS. 2 to 8.

In a comparatively simple embodiment, labels 22 are recognized with reference to more general image features such as that they are light surfaces. Only regions of interest having presumed codes 20a on labels 22 are then decoded or they are at least preferred with respect to the decoding time. An outlier, that is a region of interest outside labels 22, then, for example, has to deliver very clear indications of a code 20*b* by a high score so that a decoding is exceptionally attempted here. Apart from the named exception, the assumption is generally that regions of interest outside of labels are disruptive textures or false positive regions of interest. The codes 20*a* are grouped by the labels 22; a label forms a kind of visual bracket. A groupwise decoding order can thereby be specified, label 22 for label 22, instead of as conventionally in an order effectively random with respect to labels 22. Specific prior knowledge of certain labels 22 beyond the general image features for the recognition of labels 22 is not required.

In a further embodiment, label types are described by prior knowledge, so-called label templates. Labels 22 can thereby be classified and this information can also be forwarded to external. In addition, improvements for the decoding, the decoding order, and the regions of interest can be derived from the prior knowledge of a label 22 and retries that have a higher success probability and thus better utilize the available decoding time can be carried out in a very targeted manner.

In yet a further embodiment, information on the expected positions of the codes 20*a* of a label 22 is additionally included in the label templates. Particularly promising regions of interest can thereby be determined at positions where a code 20*a* would have to be, but have not yet been read, to acquire and discard regions of interest and to improve their positions and shapes and ultimately to carry out particularly promising retries.

In an extension of this embodiment, unnecessary decoding invocations for redundant codes 20*a* are avoided. Numerous kinds of labels 22 capture the same information in a plurality of redundant codes and the corresponding information is stored in the label template. It is thus possible to only read one of these redundant codes 20*a* or to switch to a different one of the redundant codes 20*a* if the decoding causes difficulties. The reading result can be directly transferred to the other redundant codes without a separate decoding.

FIG. 2 shows an exemplary flowchart for detecting labels 22 and for decoding with respect to labels 22. In this embodiment, specific information is not yet available for certain kinds of labels 22. The individual steps are only obligatory when this has been specifically described as such.

In a step S1, light, at least proportionally structureless surfaces are recognized. Corresponding connected components, in particular in the form of BLOBs (binary large objects), are formed for this purpose, for example. The labels 22 are recognized up to herein solely from the two general features of brightness and homogeneity. It must be pointed out that the sought labels 22 are by no means fully structureless due to the codes 20*a* located thereon in accordance with their intended purpose, but only have corresponding proportions, which is, however, sufficient as a feature for the recognition of a label 22.

In a step S2, the connected components that can be understood as candidates for labels 22 are checked with further label features to exclude as many connected components as possible that do not correspond to any label 22. The two already mentioned features of brightness and homogeneous proportions or even only one of these features are/is sometimes sufficient, but often are not alone sufficient to recognize labels 22 sufficiently distinctly. Up to five further features are preferably added: dark structures or clear black values since correspondingly printed codes 20 are assumed, a shape or contour such as that of a rectangle or another expected shape of a label 22 with or without any expected aspect ratio, expectations on the size or area because codes 20*a* should fit in, recognizable code structures having typical texture features, light/dark transitions or texture signatures of the expected code types, and orientation of the code structures within the label 22, measured, for example, on the contour or shape of the feature correspondingly listed above since the orientation is typically horizontal or vertical, but not slanted. Information on the extent to which typical texture features of a code 20*a* are present and how they are aligned can already decrease as a partial result of the segmentation. Said total of seven features can be used only partially in any desired combinations and, conversely, no exclusive list of possible features that can be checked. A particularly preferred combination of features checks the shape and the presence of texture features typical for codes in step S2 in addition to brightness and/or homogeneous proportions of step S1.

The question whether a connected component is large enough so that codes 20*a* fit in can be estimated from minimal symbol sizes and thus from an indication of how many code modules a smallest assumed code 20*a* contains, and from estimated module sizes. The module size indicates the size of the individual code modules in pixels and is estimated, for example, from previous segmentation results. Smaller connected components cannot be labels 22 with codes 20*a* so that small brightness areas such as reflections on films and the like can be excluded via this feature.

Further features are conceivable if the code reader 10 is able to detect color. There are in particular light regions that in reality are not white or light gray, but are rather yellow, for example, and that therefore typically do not quality as a label 22. Differing from this, a particular color of the labels 22 can be known in a special application; colored, homogeneous regions are then even a particularly strong indication of a label 22.

It is assumed in a step S3 that the remaining connected components correspond to labels 22. The regions of interest having potential codes 20*a-b* from the preceding segmentation are now associated with labels 22. Alternatively, step S1 is not preceded by any segmentation for codes 20*a-b*, but only a rough localization of lighter regions as the basis of step S1 and the code-related segmentation only takes place now and only within a respective label 22. In both cases, groups of regions of interest having possible codes 20*a* result, with each group being associated with a recognized label 22.

In a step S4, the regions of interest are now worked through label by label 22 by the decoder. This groupwise order or order with respect to a label 22 differs from the conventional order that only relates, for example, to a score with which the segmentation estimates the probability for a code 20*a* in the respective region of interest. Such a score can furthermore prioritize the order of the decoding within a label 22. It is equally possible that the order of the processing of the labels 22 is made dependent on such scores and a label 22 is, for example, first worked through in which the region of interest having the largest score is located, the highest average score is achieved, or the like.

In a step S5, regions of interest that do not belong to any label 22 can optionally exceptionally be processed by the decoder. This requires that a segmentation has also taken place outside labels 22 and that corresponding outliers were found here, that is regions of interest having a probable code 20*b* outside the labels 22. In order not to undermine the effect of the decoding with respect to labels, outliers have to be particularly promising, that is, for example, capture an exceptionally high score from the segmentation. Step S5 does not necessarily have to follow on from step S4. An outlier can also be decoded first or in the meantime. This is in particular of interest in the case of a line scan camera where it is easily possible that an outlier has already been detected, but not yet a complete label 22 so that the time can be used to already decode the outlier in advance.

As an alternative or supplement to the described routine of FIG. 2 with a purely classical image processing, the use of processes of machine learning or of a neural network are also conceivable. This above all relates to steps S1 and S2 for the recognition of labels 22. The process of machine learning is trained with images in which the position of labels 22 is known so that these images can acts as positive examples and simultaneously in regions without labels 22 as negative examples together with a matching annotation for a monitored teaching.

FIGS. 3a-e show some exemplary mages in different stages of the recognition of labels 22 for a further illustration of the just described procedure. FIG. 3a first shows a non-processed starting image here. FIG. 3b illustrates a texture in a detail enlargement, here of a film that may be confused with codes 20a-b and that accordingly would require a lot of unnecessary decoding time for false positive regions of interest in a conventional segmentation and decoding. Since these textures are not on a label 22 and no exceptionally high scores are associated with them either, the invention is able to exclude such regions of interest from the decoding. The structures that are lighter than a brightness threshold are highlighted in white in FIG. 3c. This was processed in FIG. 3d by an erosion filter using a 5×5 pixel filter core. Without a separate imaging, a minimum size, an approximately rectangular shape, and the presence of textures for code structures were then required and connected components were formed with the remaining bright structures. Only the four candidates for labels 22 marked in FIG. 3e then remain. Three of them can also be recognized as labels 22 with the naked eye. The elongate bright adhesive strip is still correctly considered as a label 22 among the discussed criteria even though this is objectively not correct and could still be filtered using an aspect ratio or a stricter specification for code-like structures.

FIG. 4 shows an exemplary flowchart for identifying a label 22 using a label template and with respect to the decoding with reference thereto. The individual steps are furthermore only obligatory when this has specifically described as such. In this embodiment, work is thus largely not performed exclusively with general image features to recognize labels 22 as such. Prior knowledge of certain expected kinds of labels 22 is rather also captured via the label templates. Such prior knowledge makes it possible to use the available decoding time in an even more optimized manner. For if, for example, the codes 20a located on the recognized label 22 in accordance with the label template, reading efforts can be stopped on this label 22 since any further regions of interest on this label 22 have to be false positive. Furthermore, very targeted, particularly promising retries can be performed. Finally which labels 22 have been detected, for example by configurable names or numbers of the label templates can be made available as additional output information.

A label template comprises different pieces of information that describe a label 22. This preferably includes, for implementation reasons alone, a designation, that is preferably speaking, and refers, for example, to the manufacturer of the label 22. How many codes 20a on a label 22 of the associated type are to be decoded and what their code type is are preferably further indicated. Symbol sizes or code lengths per code type can optionally be indicated. Prior knowledge for specific codes can be stored as support for the decoder; reference is made for this purpose to the documents EP 3 428 835 A1 and EP 4 258 160 A1 named in the introduction. Finally, redundancies can be indicated that are utilized in an embodiment presented below. Again optionally, label properties corresponding to the image features presented with respect to FIG. 2 can be contained, that, therefore, for example, a label of the associated type is yellow and rectangular and has an aspect ratio of 3:2. The list is not exclusive. Code positions are in particular added later as a further possible property in a label template. Examples for a simple label template are accordingly: Type1—4xDMx redundant, 1xC128, or Typ22—6xEAN129 redundant.

Label templates are specified by the user, either by parameterization, as a data field or a graphical user interface that makes suggestions to the user semiautomatically where possible. It is also conceivable to teach label templates automatically from respective examples, optionally based on a user suggestion and/or with its later improvements.

In a step S11 of the routine in accordance with FIG. 4, a label 22 has now already been recognized, in particular with reference to the procedure already explained with reference to steps S1 and S2 of FIG. 2. The decoding is delayed for so long here until this recognition has been completed and the regions of interest on the labels 22 are also known by the segmentation, with a possible exception of outliers, that is codes 20b outside label 22 that have been recognized as codes 20b with high reliability and that have possibly already been decoded in the meantime.

In a step S12, the regions of interest are grouped with the labels 22 and are sorted according to their scores. In this respect, the sorting can also take place gradually, that is, for example, only the respective region of interest having the highest score can be located.

In a step S13, the regions of interest of a label 22 are processed by the decoder in accordance with their sorting. The decoding thus takes place groupwise per label 22, see also the description of step S14 of FIG. 2 for this purpose.

A check is made in a step S14 whether a first code, or in later iterations a further code 20a, was able to be read on a label 22. If no code 20a can be read, no comparison with label templates is possible either; the remaining decoding time then has to be divided up using the conventional means until a code 20a can nevertheless be read or no more decoding time is available.

A check is made in a step S15 whether a label template can be identified and accordingly all the codes 20a on the label 22 have been read. This is then a complete success (good read) for the label 22. In a step S16, information on the identity of the label 22 and all the code contents of the codes 20a located thereon can be output. If there is still a further label 22, the decoding is continued there, without any explicit representation of a corresponding arrow in the routine of FIG. 4; otherwise new image data can be waited for.

In a step S17, a check is made, alternatively to a complete identification and working through of a label 22, whether there are anyway candidates among the label templates that have been partially hit with the previously read codes 20a. If this is not the case, the label 22 is classified as unknown in a step S18. If decoding time is still available, an attempt can be made to continue the decoding with further regions of interest. However, this can no longer change anything about the result that the label 22 is unknown and does not fit any label template. However, even all the codes of an unknown label 22*a* can by all means be successfully decoded.

If, on the other hand, at least one label template matches the previous reading results, the most suitable one or a random one of these label templates is provisionally assigned and regions of interest on the label 19 that promise a particularly high prospect of reading success on a retry are derived therefrom in a step S18. Iteration then takes place with this in step S13 to read even more codes 20*a* where possible. If there is no longer any decoding time available a stop is made at step S18 and thus by an unknown label 22 and only partially processed regions of interest of this label 22.

FIG. 5 shows an exemplary image of an outlier, that is of a code 20*b* that has been applied directly to a parcel and not to a label 22. An exception from the decoding related only to labels 22 is thus illustrated that has already been explained with respect to step S5 of FIG. 2 and that can also be added in FIG. 4. An attempt is then made to decode a certain number of outliers and/or an outlier having a particularly high score, preferably still during the image detection and the recognition of labels 22, otherwise while assigning a certain portion to the decoding time accordingly available.

FIG. 6 shows an exemplary image of a label having a plurality of codes to illustrate the indication of positions of the codes on a label with reference to beams with angle and length. This is a particularly advantageous aspect for a further embodiment of the invention in which label templates contain information on the internal geometry of a label. The shape of the label and the positions of the codes on the label are geometrical properties of particular interest.

The geometrical properties first have to be taught. This can be parameterized by hand, as already described with respect to the other information of a label template, preferably supported by an input mask, an editor, or a graphical user interface in which code positions are marked on an exemplary image by hand, for example.

However, the positions are preferably automatically detected. Suitable exemplary images of a label with respect to a label template can be presented in a targeted manner, for example during a putting into operation. There is the possibility, on the other hand, that label templates are completed, either in advance or during operation, using random objects with labels 22 not separately selected for the teaching. There is already a label template for this that has, however, not yet been fully completed. If a recording is then associated with the label template, as described with reference to FIG. 4, for instance, the position of the read codes can be determined with reference thereto and the corresponding information in the label template can be supplemented or modified.

The positions should preferably be stored in the label template with invariant rotation and scaling since labels are detected in arbitrary orientation and from the most varied distances in reading operation. The positions of all the codes of a label template can advantageously be defined by the desired invariances if a randomly selected code of the label template is selected as the reference code. This is illustrated in FIG. 6. Reference point 30 is the focus of the reference code. The scan direction 32 perpendicular to the bars of the reference code can serve as an anchor for the orientation. With a 2D code, its, for example, horizontal alignment can be used in an analogous manner. Alternatively, the external shape 34 of the label 22 could also be used here, but the scan direction 32 is more stable and is anyway known in the course of the code reading. Starting from this reference point, beams 36 are drawn through the focuses 38 of the remaining codes of the label whose orientation is described, for example, via a respective angle with respect to the scan direction 32. The condition of rotation invariance is thus satisfied. To also become scale invariant, the distance of the reference point 30 from a further code can be measured along the associated beam 36 in units of the module sizes of the reference code. This module size is estimated as part of the decoding of the reference code and is even exactly known after its successful decoding.

The codes 20*a* of a label 22 are first read from an exemplary image to teach the positions for a label template. One of the codes 20*a* is selected as a reference code and its focus is fixed as the reference point 30. The angle with respect to the scan direction 32 of the reference code is determined for the beams 36 or connection lines with reference to the focuses of the other codes 20*a*. The distances along the beams 36 are first measured in pixels and are then converted into units of the module size of the reference code that is known from the decoding of the reference code. Perspective effects, for instance in the case of a reading from the side, can be corrected with reference to the shape 34 of the label 22 or that of the codes 20*a*.

Position data, for example an angle and a distance in units of the module size of a reference code and the identity of the reference code are accordingly stored per code in the label templates. A plurality of such position data can be stored per code for different reference codes. This redundancy allow a choice in operation of which just read code can be used as the reference code. It is furthermore conceivable to detect further geometrical information and to store it in the label template such as distances from margins of the label 22 or sizes of adjacent codes in units of their own module size.

FIG. 7*a* shows an illustration of the information of a label template with respect to shape and positions; The same reference code as in FIG. 6 has been selected. The positions of the further codes 20*a* are now simply marked by a cross even though work is still preferably carried out with the described rotation and scaling invariant position data.

FIG. 7*b* shows an illustration of the check whether a label template matches a recorded label 22*a* with reference to the information related to the shape and position shown in FIG. 7*a*. To be able to use a label template at all, there must be at least one hypothesis of which label template could match, for example as explained with reference to steps S15 and S17 of FIG. 4. The position data of the label template and the focuses 38 of read codes 22*a* of the label 22 can be used in different manners. Desired positions of the label template can be compared with actual positions of the read codes 20*a* to strengthen the hypothesis on the matching of the label template with the label 22. With a fixed identity, the actual positions can be used to complete or update the label template. And, starting from a successfully read reference code, a prediction can be made on the further positions at which codes should still be located.

The latter can be used to carry out targeted retries specifically at the expected positions of codes. Further decoding time is thus assigned to those regions of interest that are not false positive regions of interest.

Continuing, a subsequent segmentation can take place to obtain better regions of interest at the expected code positions or to generate regions of interest at all that were overlooked in the prior segmentation. Prior knowledge on where a region of interest of the still missing code must be located is available from the label template and after reading the reference code. Further reading attempts can then be carried out using a region of interest that was determined or corrected with the aid of this prior knowledge. It is helpful for the subsequent segmentation if the label template contains information on the extent of its codes. This can be indicated in scale invariant units of module sizes like the position information. This above all relates to the vertical direction since the width direction varies in dependence on the code content.

There is finally the possibility of verifying labels 22, that is to give feedback on an incorrect print or the like. Codes 20a are frequently applied too closely to the margin of the label 22. If code elements are thereby missing that were even no longer printed in the region of the label 22 the code 20a possibly becomes unreadable. Such position errors are recognized using the label template to, for example, correct corresponding printing errors in future labels 22.

FIG. 8 shows an exemplary image of a label 22 having four redundantly applied DMX codes 40 to illustrate a possible expansion of the previously explained embodiments. Such redundancies are usual and the label template can contain corresponding information. If now one of the redundant codes 40 is successfully read, unnecessary decoding invocations for the further redundant codes 40 can be saved. The code content is known from the first reading of one of the redundant codes 40 and can be transferred directly to the remaining redundant codes 40.

In addition to outputting code content, providing image data at the output side is also often expected from the code reader 10. In this respect, however, a large amount of image data arise, particularly when the original high resolution is maintained. A resolution reduction, on the other hand, impairs possible downstream image evaluations. The recognition of labels 22 now allows images to be left at a high resolution for data reduction and particularly to crop them to the region of the label 22. In addition, a full image of reduced resolution can be output.

It is conceivable to not use the described processing and decoding related to labels 22 constantly, but rather to provide a label decoding mode in addition to the conventional procedure. A switch to the new mode is then made by hand, for example, if it is known that a large number of labels 22 will follow in the application or is also made automatically if there are too many false positive regions of interest in the standard mode.

With continuously light objects or those that are provided with a label 22 over the whole surface, a number of advantages of the invention are not implemented since there are no regions of interest outside labels 22. In some cases, a label 22 is nevertheless recognized and identified so that, for example, code positions are still checked or predicted. If the identification of the label 22 is not successful, the total object is treated as an unknown label 22, which is ultimately due to the same procedure as conventionally without taking labels 22 into account. The decoding can, however, equally explicitly drop back into the standard mode in such situations.

As an alternative or addition, a logo on a label can be used for the identification of the label. The label template in this case contains information on the logo, for example an exemplary image of the logo or describing features by which the logo can be recognized. The routine can then differ from FIG. 4 since a label is identified with reference to the logo and not to a read code. It is equally conceivable that the identification via read codes and a logo complement one another or supersede one another depending on the situation. Once the at least rough geometry of a label within the image data has been located, as explained with reference to FIG. 2, hypotheses already result in dependence on label templates potentially in question as to where the respective logo must be within the label. A comparison between the expected logo and the image information in the region of the label can therefore be carried out in a very targeted manner and only for a few, small image sections.

Once a logo has been recognized and a label has thus been identified via its label template, a prediction can be made from the position of the logo with reference to the label template as to where regions of interest of the codes are on the label. The logo thus replaces or completes the read codes that are used as anchors or reference codes in FIG. 4. The above-described mechanisms can be used in an analogous manner for the rotation and scale invariant location of the regions of interest starting from the logo as the anchor. The logo can thus simplify and improve the locating and reading of codes in a number of situations. It is furthermore also conceivable that a label is at least identified with reference to its logo even in the unfavorable situation in which no single code is readable thereon. This facilitates the search for errors and, where necessary, a subsequent manual encoding.

The invention claimed is:

1. An optoelectronic code reader for reading optical codes, comprising:
   at least one light reception element for generating image data from received light; and
   a control and evaluation unit that is configured to:
   segment the image data to locate regions of interest having assumed optical codes;
   process the regions of interest by a decoding process to read code content of an optical code in the region of interest;
   recognize a label in the image data; and
   distinguish between ones of the regions of interest which are part of the label from ones of the regions of interest which are not part of the label, wherein the ones of the regions of interest which are part of the label are processed differently by the decoding process than the ones of the regions of interest which are not part of the label.

2. The optoelectronic code reader in accordance with claim 1,
   wherein the control and evaluation unit is configured to group the regions of interest by labels.

3. The optoelectronic code reader in accordance with claim 1,
   wherein the control and evaluation unit is configured to determine a score for the regions of interest on how reliable an optical code has been detected in the region of interest, and to take account of the score in the order of the processing of the regions of interest by a decoding process.

4. The optoelectronic code reader in accordance with claim 3,
   wherein the control and evaluation unit is configured to assign a higher score to regions of interest that are part of a label.

5. The optoelectronic code reader in accordance with claim 1,
   wherein the control and evaluation unit is configured to process regions of interest of a label directly after one another by a decoding process so that regions of interest of a label are worked through as a group.

6. The optoelectronic code reader in accordance with claim 1, wherein the control and evaluation unit is configured to recognize a label using its brightness and homogeneous texture.

7. The optoelectronic code reader in accordance with claim 1, wherein the control and evaluation unit is configured to recognize a label with the aid of at least one of the following criteria: dark structures, shape, size, code structures contained, orientation of the code structures within the label.

8. The optoelectronic code reader in accordance with claim 1, wherein the control and evaluation unit has access to at least one label template that characterizes a known label type, with a label template having a plurality of optical codes present on this label type.

9. The optoelectronic code reader in accordance with claim 8, wherein the label template having a plurality of optical codes present on this label type includes the respective code type and/or position of the optical code within a label.

10. The optoelectronic code reader in accordance with claim 8, wherein the control and evaluation unit has access to at least one label template that has at least one logo.

11. The optoelectronic code reader in accordance with claim 8, wherein the control and evaluation unit is configured for an automatic teaching in which a label template or a property of a label template is taught from detected image data.

12. The optoelectronic code reader in accordance with claim 8, wherein the control and evaluation unit is configured to identify a label with reference to a label template.

13. The optoelectronic code reader in accordance with claim 12, wherein the control and evaluation unit is configured to identify the label with the aid of at least one already decoded optical code of a region of interest of the label or of a logo.

14. The optoelectronic code reader in accordance with claim 12, wherein the control and evaluation unit is configured to process regions of interest in an at least partially identified label for so long by a decoding process until all the optical codes of the label have been decoded.

15. The optoelectronic code reader in accordance with claim 8, wherein the control and evaluation unit is configured to transfer the code content of a region of interest having one of the plurality of optical codes of the same code content to at least one further region of interest in the case that a plurality of optical codes of the same code content are present in a label in accordance with the label template.

16. The optoelectronic code reader in accordance with claim 8, wherein the control and evaluation unit is configured to adapt the regions of interest of a label with the aid of a label template.

17. A method of reading optical codes, comprising:

generating image data from received light;

segmenting the image data to locate regions of interest having assumed optical codes;

processing the regions of interest by a decoding process to read code content of an optical code in the region of interest;

recognizing a label; and distinguishing between ones of the regions of interest which are part of the label from ones of the regions of interest which are not part of the label, wherein the ones of the regions of interest which are part of the label are processed differently by the decoding process than the ones of the regions of interest which are not part of the label.

18. The optoelectronic code reader in accordance with claim 1, wherein the control and evaluation unit is further configured to:

recognize a plurality of labels in the image data; and for each of the labels, identify ones of the regions of interest which are part of the respective one of the labels.

19. The method of reading optical codes in accordance with claim 17, further comprising:

recognizing a plurality of labels in the image data; and for each of the labels, identifying ones of the regions of interest which are part of the respective one of the labels.

* * * * *